US012065205B2

(12) United States Patent
Galat et al.

(10) Patent No.: US 12,065,205 B2
(45) Date of Patent: Aug. 20, 2024

(54) SPROCKET WITH A ROLLER ASSEMBLY INSERTED INTO THE SPROCKET TEETH

(71) Applicant: Caterpillar Inc., Peoria, IL (US)

(72) Inventors: Michael Stephen Galat, Peoria, IL (US); Lewis C. Hunt, Chillicothe, IL (US); Temitope O. Akinlua, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 419 days.

(21) Appl. No.: 17/368,048

(22) Filed: Jul. 6, 2021

(65) Prior Publication Data

US 2023/0009851 A1    Jan. 12, 2023

(51) Int. Cl.
*B62D 55/12* (2006.01)
*B62D 55/30* (2006.01)

(52) U.S. Cl.
CPC ............. *B62D 55/12* (2013.01); *B62D 55/30* (2013.01)

(58) Field of Classification Search
CPC ...... B62D 55/12; B62D 55/30; B62D 55/125; B62D 55/13; B62D 55/135; F16H 2055/306; F16H 55/00; F16H 55/10; F16H 55/1416

See application file for complete search history.

(56) References Cited

U.S. PATENT DOCUMENTS

| | | | | |
|---|---|---|---|---|
| 1,450,008 A | * | 3/1923 | Quinlan | A47L 13/144 |
| | | | | 15/119.1 |
| 1,955,938 A | * | 4/1934 | Berkowitz | G03B 1/50 |
| | | | | 226/54 |
| 3,460,153 A | * | 8/1969 | White | G01N 31/222 |
| | | | | 346/33 A |
| 3,889,550 A | | 6/1975 | Boggs et al. | |
| 5,829,850 A | * | 11/1998 | Ketting | F16G 13/06 |
| | | | | 305/203 |
| 2021/0009216 A1 | | 1/2021 | Bland et al. | |
| 2021/0059434 A1 | * | 3/2021 | Ciesick | A47F 5/0043 |

FOREIGN PATENT DOCUMENTS

| | | | | |
|---|---|---|---|---|
| CN | 104115616 A | * | 10/2014 | |
| DE | 4128302 | | 5/1993 | |
| DE | 4443590 A1 | * | 6/1996 | ............ B65G 23/06 |
| DE | 4443590 C2 | | 1/1998 | |
| DE | 10257659 B4 | | 4/2005 | |
| DE | 102014212619 | | 12/2015 | |
| JP | 09257105 A | * | 9/1997 | .............. F16H 7/06 |
| WO | 2013060823 A1 | | 5/2013 | |

* cited by examiner

*Primary Examiner* — S. Joseph Morano
*Assistant Examiner* — Eva L Comino

(57) ABSTRACT

A sprocket segment assembly for use with a sprocket of a tracked machine includes a first circumferential sprocket segment including a tooth with a first bushing contact surface, a second bushing contact surface, and a top surface extending circumferentially between the first bushing contact surface and the second bushing contact surface. The first bushing contact surface defines a cavity, and a roller extending proudly of the first bushing contact surface.

19 Claims, 7 Drawing Sheets

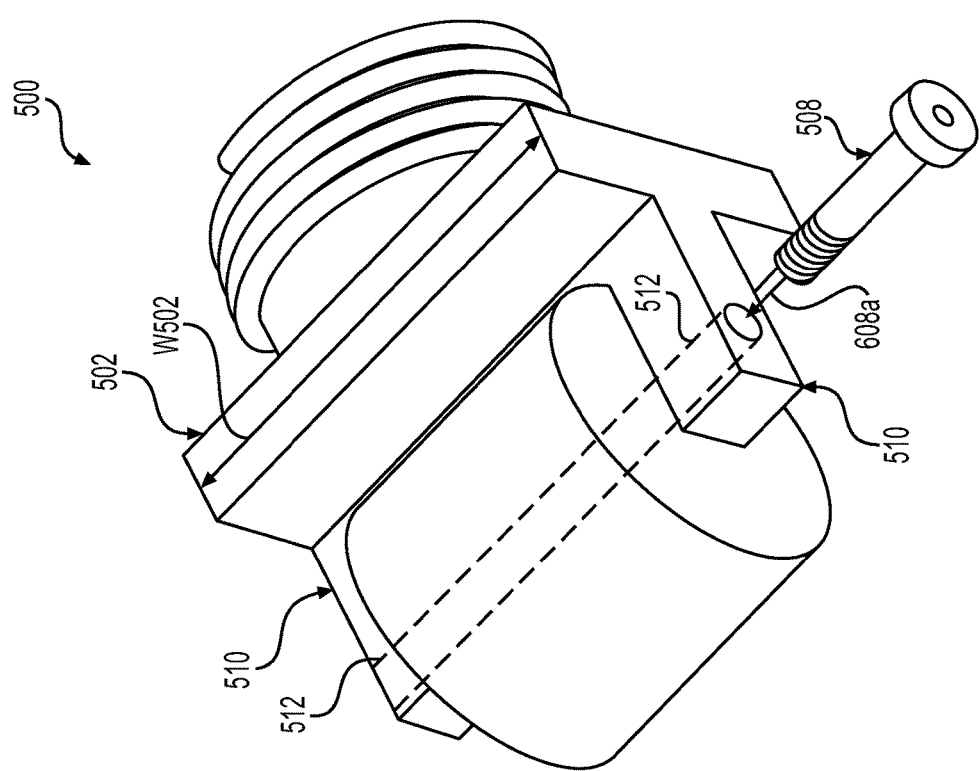

SPROCKET WITH A ROLLER ASSEMBLY INSERTED INTO THE SPROCKET TEETH

TECHNICAL FIELD

The present disclosure relates generally to a rotating track guide components such as track idlers, track rollers, and sprockets etc. that are designed to resist wear. More particularly, the present disclosure relates to such track guiding components that include a roller assembly for reducing the amount of wear between the track (e.g., the track bushing) and the sprocket.

BACKGROUND

Track type machines typically utilize track chains on each side of the machine that engage the ground surface during propulsion of the machine. A plurality of individual links are pivotably coupled via bushing and pin arrangements to form the track chain. A sprocket, driven by an engine of the machine, engages the bushings and translates the chain about one or more idlers. As the chain translates, the connected links engage a ground surface under the machine, for example, via coupled track shoes, and propel the machine on the surface. Track chains can be a straight link chains with alternating inner and outer links or can be offset link chains where all the links are alike. In both types of track chains, the elements wear over time, particularly the bushings that are continuously engaging with the sprocket in order to propel the machine.

German patent no. DE 4443590 C2 discloses a plurality of spring loaded inserts disposed at the valley between the teeth of the sprocket. These spring loaded inserts are designed to reduce the amount of noise produced as the track chain engages the sprockets.

Accordingly, there is exists a need for a sprocket that includes a device that helps reduce the amount of wear induced on the bushing of the track chain with which it mates.

SUMMARY

In an aspect, a sprocket segment assembly for use with a sprocket of a tracked machine may be provided. The sprocket segment assembly may define a radial direction, a circumferential direction, and an axial direction. The sprocket segment assembly may comprise at least a first circumferential sprocket segment including at least one tooth with a first bushing contact surface, a second bushing contact surface, and a top surface extending circumferentially between the first bushing contact surface and the second bushing contact surface. A roller may be disposed proudly of the first bushing contact surface.

In another aspect, a sprocket for use with a track assembly may be provided. The sprocket may define a radial direction, a circumferential direction, and an axial direction. The sprocket may comprise at least a first circumferential sprocket segment including at least one tooth with a first bushing contact surface, a second bushing contact surface, and a top surface extending circumferentially between the first bushing contact surface and the second bushing contact surface. The first bushing contact surface may define a first cavity extending radially from the top surface, and a second cavity extending from the first bushing contact surface to the first cavity.

A spring loaded roller subassembly sprocket or sprocket segment assemblies may also be provided that may comprise a roller, a yoke, and a compression spring. The yoke may include two arms, while the roller may include a cylindrical body including two end faces that are rotatably attached to the two arms of the yoke.

BRIEF DESCRIPTION OF THE DRAWINGS

FIG. 7 is a perspective view of the spring loaded roller, yoke, axle member, and compression spring employed in FIG. 6. An axle member in the form of a cap screw is shown.

DETAILED DESCRIPTION

Figure 1:
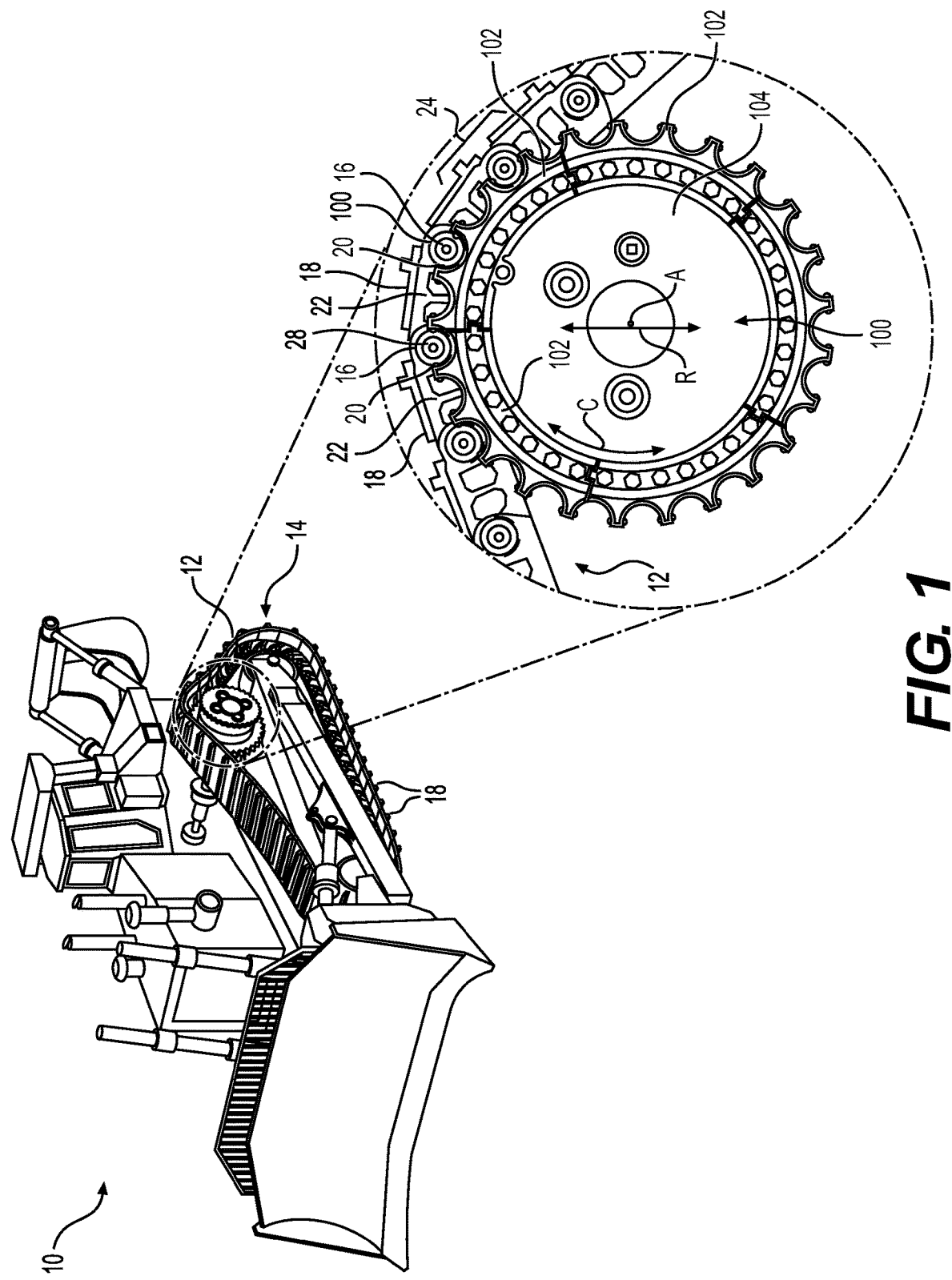
FIG. 1 is a perspective view of an exemplary machine, with an enlarged section of the exemplary machine showing the engagement of a sprocket and bushings of a track chain assembly. The sprocket includes a plurality of spring loaded rollers on its periphery that engage the bushing of the track chain assembly.

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements but may include other elements not expressly listed or inherent to such a process, method, article, or apparatus. In this disclosure, relative terms, such as, for example, "about," "substantially," and "approximately" are used to indicate a possible variation of ±10% in the stated value.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

FIG. 1 illustrates a machine 10 with a track assembly 12 according to the present disclosure. Machine 10 may be a track-type tractor or any mobile machine that performs some type of operation with an industry, such as mining, construction, farming, transportation, or any other industry known in the art, for example, a dozer, an excavator, a loader, a backhoe, a motor grader, or any other earth moving machine. In one aspect, machine 10 may be a medium track-type tractor. In other aspects, however, machine 10 may be a small track-type tractor or a large track-type tractor, etc. Track assembly 12, which may also be referred to as a track link assembly or a track chain assembly, may be coupled to an undercarriage assembly 14 of machine 10 and driven by a machine engine or other power source (not shown) via at least one drive gear or sprocket 100. A separate track assembly 12 may be coupled to each side of machine 10, with each track assembly 12 forming separate endless loops. A plurality of track shoes 18 may be coupled to an outer surface of track assembly 12 in order to aid in the engagement of the ground surface.

Track assembly 12 may be a chain that includes multiple structurally similar link subassemblies, each of which may include a pair of links. A pair of links may include a link 22 and a respectively paired link (not shown in the enlarged section of FIG. 1, which is a side view) that is parallel and spaced opposite from link 22. Links 22 and their respectively paired links may be straight or offset links, and each include apertures at respective opposite ends (e.g., a first-end aperture and a second-end aperture).

Successive link subassemblies may be coupled by a pin 16 and a bushing 20. For example, to couple a first link subassembly with a successive a second link subassembly, pin 16 may be fixedly received in the first-end apertures of the links of the first link subassembly and bushing 20 may be fixedly received in the second-end apertures of the links of the second link assembly. As such, pin 16 and bushing 20 couple two link subassemblies 24 together to form a portion of track assembly 12.

Each pin 16 may be a substantially cylindrical rod and may be sized to be slip fit through bushing 20. Each bushing 20 may be generally cylindrical, with a cylindrical channel extending longitudinally through bushing 20 as a bore. The bore and the pin may have a constant diameters, but not necessarily so.

The interaction between the sprocket and the bushing often leads to wear and necessary maintenance, and downtime for the machine. The solution for this bushing wear out issue may be to place a roller in the sprocket itself. This may eliminate the sliding wear that takes place between the bushing and the sprocket. This solution may also be simple and cost-effective.

Figure 2:
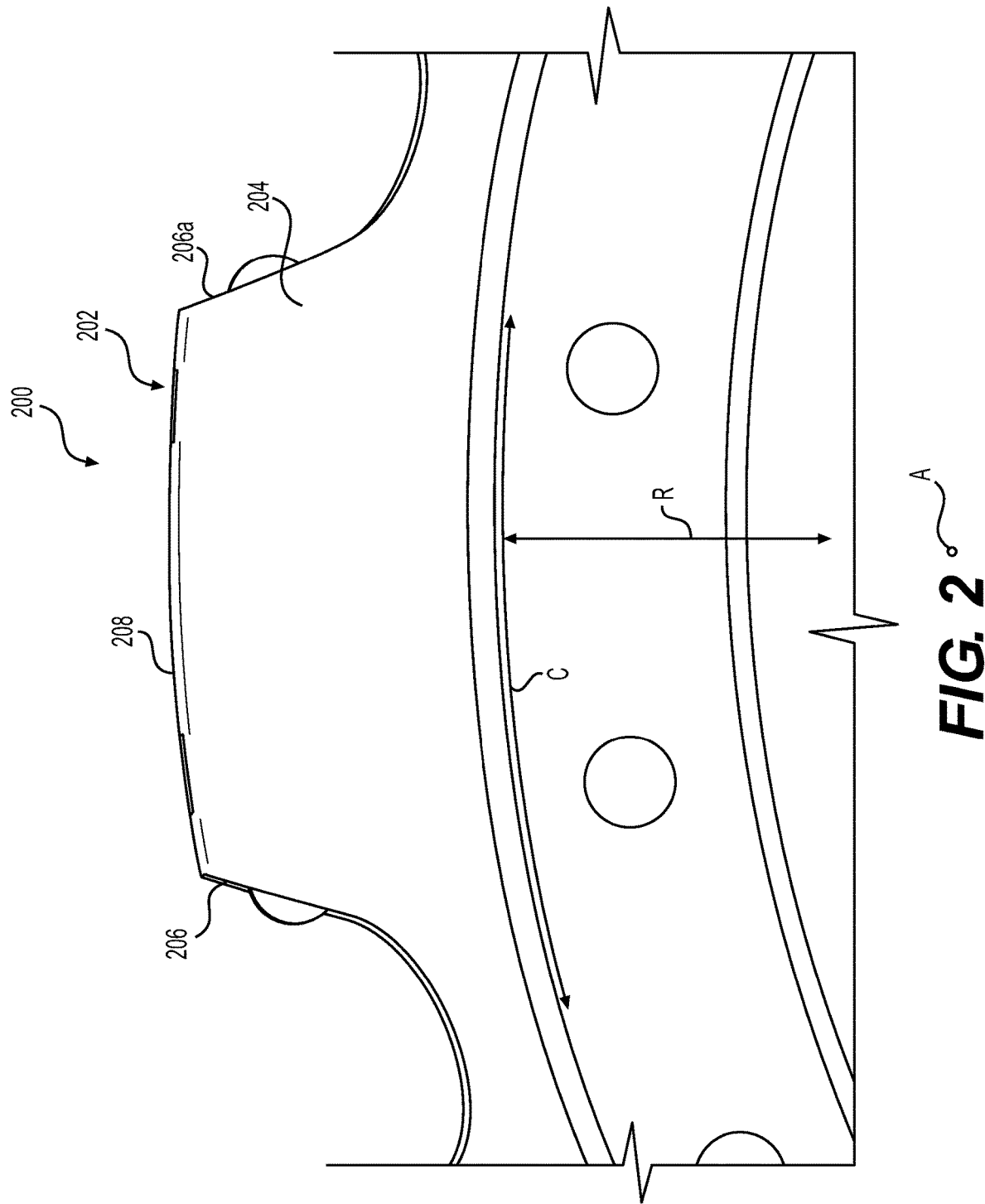
FIG. 2 is an enlarged view of a portion of the sprocket of FIG. 1, illustrating the spring loaded rollers situated on the on the side surfaces of the teeth of the sprocket more clearly.

Looking at FIGS. 1 and 2, it may be understood that the sprocket 100 is often an assembly with a plurality of sprocket segments 102 attached to a hub 104. However, it is contemplated that the sprocket may be substantially made of a single piece of material, etc. Various aspects of the present disclosure may include sprocket segment assemblies such as shown in FIG. 2 that may be attached to the hub.

Focusing now on FIG. 2, the sprocket segment assembly 200 may define a radial direction R, a circumferential direction C, and an axial direction A (see also FIG. 1). The sprocket segment assembly 200 may comprise one circumferential sprocket segment 202 (may be a single segment that is unitary with the hub, or a plurality of segments fastened to the hub, etc.) including at least one tooth 204 with a first bushing contact surface 206, a second bushing contact surface 206a, and a top surface 208 that extends circumferentially between the first bushing contact surface 206 and the second bushing contact surface 206a. The first bushing contact surface 206 (and possibly 206a as well) may define a center cavity 210, and a roller 212 may be disposed in the center cavity 210, extending proudly (e.g., past or beyond) of the first bushing contact surface 206. The roller may make rolling contact with the bushing of the track, decreasing the amount of sliding wear.

Figure 3:
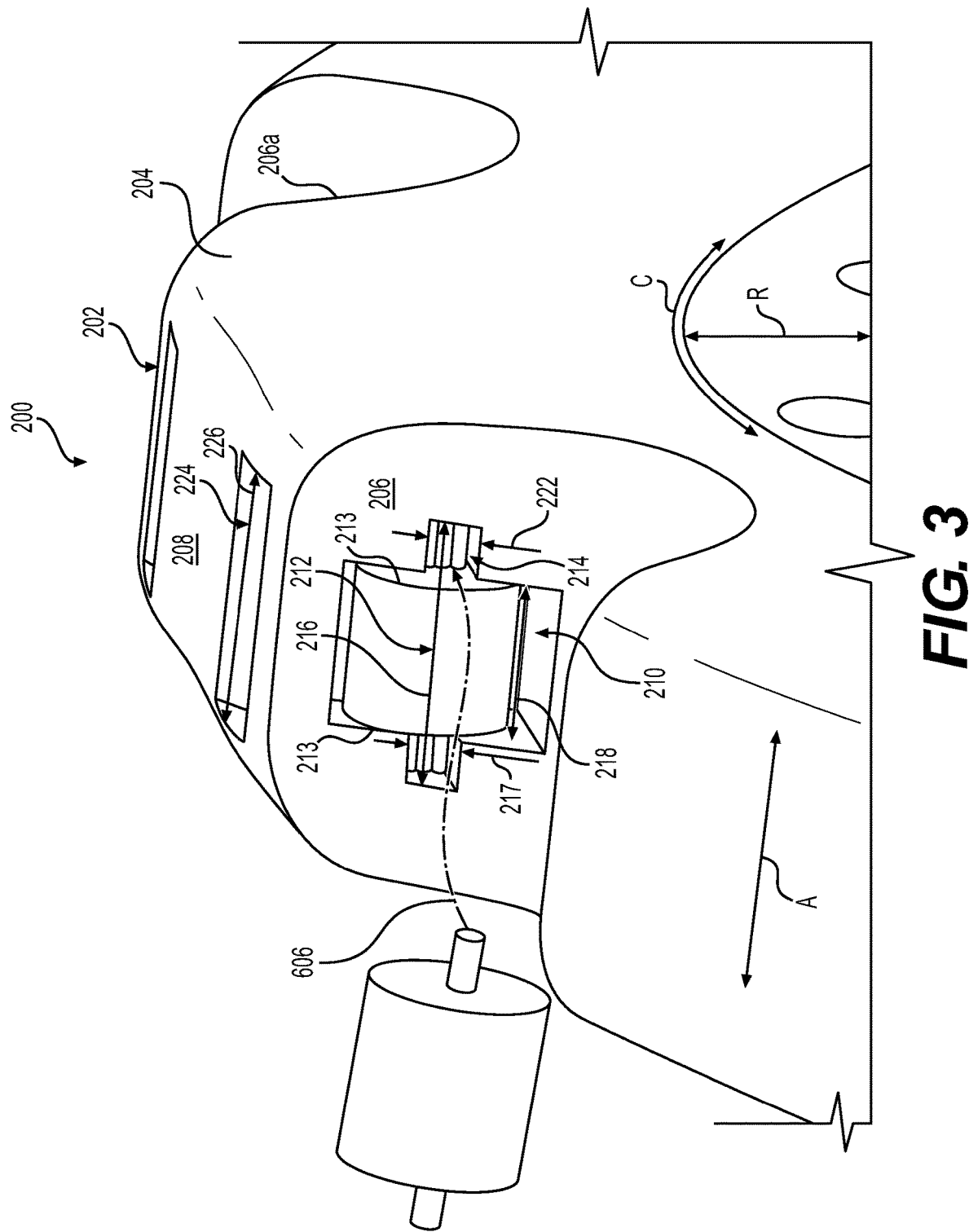
FIG. 3 is a perspective view of the sprocket of FIG. 2, showing the spring loaded roller disposed in a cavity of the side surface of a tooth.
Figure 6:
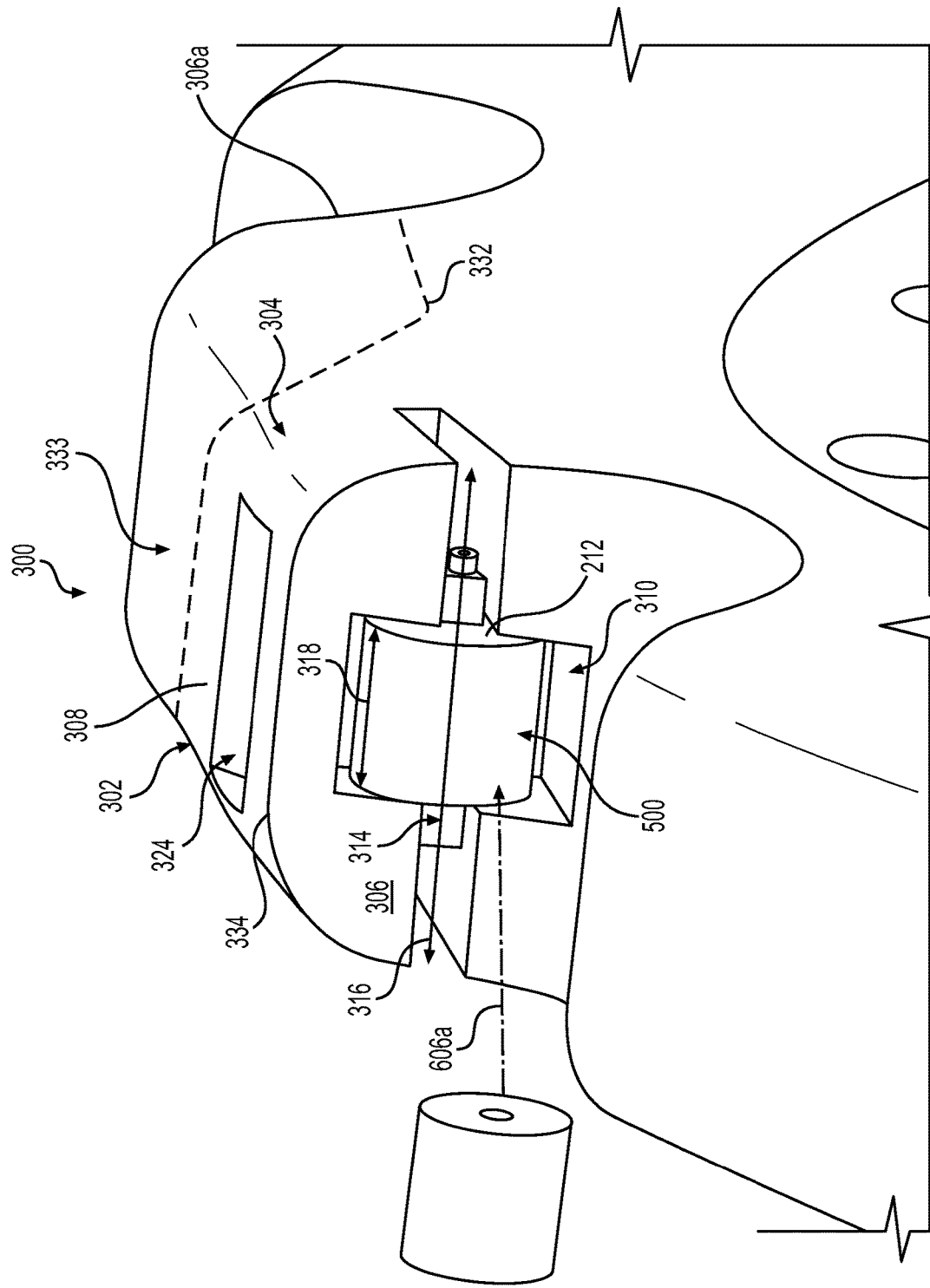
FIG. 6 is perspective view of another sprocket with extended slots for receiving an axle member to attach the roller to the yoke according to another embodiment of the present disclosure.

Turning to FIGS. 3 and 6, various versions of the sprocket segment assemblies 200, 300 and their respective segments 202, 302 can be seen. The first bushing contact surface 206, 306 may define both a center cavity 210, 310, and a slit 214 running axially through the center cavity 210. The slit 214, 314 may define a slit axial dimension 216, 316, and the center cavity 210, 310 may define a center cavity axial dimension 218, 318 that is less than the slit axial dimension 216, 316. In FIG. 6, the slit 314 extends completely through the tooth. This is not the case in FIG. 3.

As best seen in FIG. 3, the center cavity 210 defines a center cavity radial dimension 220, and the slit 214 defines a slit radial dimension 222 that is less than the center cavity radial dimension 220. Moreover, the slit is radially, and axially centered with respect to the center cavity. Similar statements may be made with respect to the design in FIG. 6. A "+" or "t" configuration may be formed by this structural arrangement of cavities.

Figure 4:
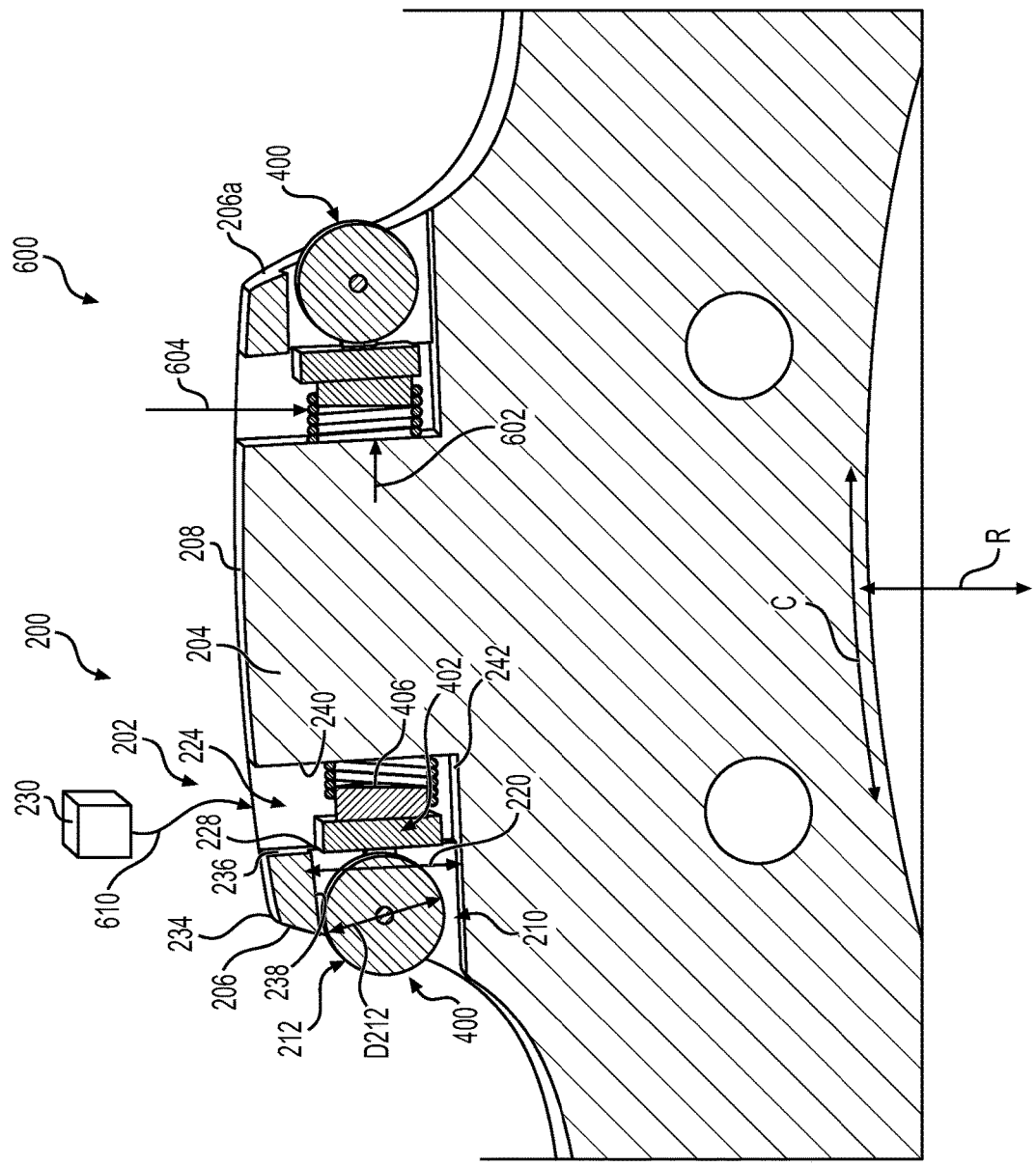
FIG. 4 is a cross-sectional view of the sprocket assembly of FIG. 3 taken along a lines 4-4 thereof, revealing the inner cavities into which the spring loaded roller, its yoke, and spring are disposed.

Referring now to FIG. 4, the top surface 208 defines a top cavity 224 that extends radially to the center cavity 210, and the top cavity is in communication with center cavity and the slit. This may not always be the case. Also, the top cavity 224 defines a top cavity axial width 226 that is equal to or greater than the slit axial dimension 216. This is not the case in FIG. 6.

In addition, a spring loaded roller subassembly 400 may be disposed in the center cavity 210, the slit 214, and the top cavity 214. The spring loaded roller subassembly 400 may include a roller 212, a yoke 402, and a compression spring 404. Similar statement may be made about the design in FIG. 6.

The roller 212 may define a diameter D212 that is less than the center cavity radial dimension, the yoke 402, 502 defines a yoke axial width W402, W502 that is greater than center cavity axial dimension 218, engaging a ledge 228 formed by the intersection of the top cavity 224 with the center cavity 210. The yoke 402 may also include a rearward extending boss 406 that is surrounded by the compression spring 404. The outer diameter of the boss 406 may be slightly greater than the inner diameter of the compression spring 404, helping to attach and hold the spring to the yoke during assembly, etc. A cap 230 may cover and/or be inserted into the top cavity 224 after assembly to help prevent the ingress of debris and dirt, etc. Similar statements may be made with regard to the design in FIG. 6. In FIGS. 4 and 6, the roller 212 may be proud relative to the first bushing contact surface 206, 306. Similar statements may be made regarding the second bushing contact surface 206a, 306a and its spring loaded roller subassembly 400.

Now, a first circumferential sprocket segment 202, 302 that may be provided as a replacement part or to form the aforementioned assemblies will be discussed starting with FIGS. 3 and 6. The segment 202, 302 may include at least one tooth 304 with a first bushing contact surface 206, 306, a second bushing contact surface 206a, 306a, and a top surface 208, 308 extending circumferentially between the first bushing contact surface 206, 306, and the second bushing contact surface 206a, 306a. As alluded to earlier herein, the first bushing contact surface 206, 306 may define a first cavity (e.g., top cavity 224, 324) extending radially from the top surface 208, 308, and a second cavity (e.g. slit 214, 314 or center cavity 210, 310) extending from the first bushing contact surface 206, 306 to the first cavity.

The first cavity (e.g., top cavity 224, 324) may be spaced away from an intersection 234, 334 of the first bushing contact surface 206, 306, and the top surface 208, 308, forming a front side edge 236 (see FIG. 4, understood to be present in the design of FIG. 6). The second cavity (e.g., center cavity 210, 310) may also be spaced away from the intersection 234, 334 of the first bushing contact surface 206, 306, and the top surface 208, 308, forming a top ledge 238 (see FIG. 4, understood to be present in the design of FIG. 6). However, as shown in FIG. 6, this may not be the case when a full notch 332 is formed so that a corner member 333 may be provided with the necessary cavities that houses the spring loaded roller subassembly 500. If employed, the corner member may be fastened to the sprocket segment in a similar manner as the sprocket segment is fastened to the hub, etc. Other forms of fastening or attachment are possible.

Focusing on FIG. 4, the front side edge 236 of the first cavity extends axially and radially past the second cavity (e.g., center cavity 210), and the first cavity also defines a rear side edge 240. It is to be understood that similar statements may be made about the design in FIG. 6, but not necessarily so.

The second cavity further defines a bottom ledge 242 that extends to the rear side edge 240 of the first cavity. In addition, the first bushing contact surface 306 further defines a third cavity (e.g., slit 214, see also FIG. 3) that extends axially past the second cavity, and extends radially a first predetermined distance 217, while the second cavity extends radially a second predetermined distance (e.g., center cavity radial dimension 220) that is greater than the first predetermined distance 217. Again, similar statements may be made with reference to FIG. 6 except that the slit 314 extends completely through the tooth allowing access to a threaded cap screw that may form an axle member 508 for the spring loaded roller subassembly 500.

In both FIGS. 3 and 6, the first bushing contact surface 206, 306, and the second bushing contact surface 206a, 306a are planar (or approximately planar). Other configurations are possible for these surfaces including arcuate, etc.

Figure 5:
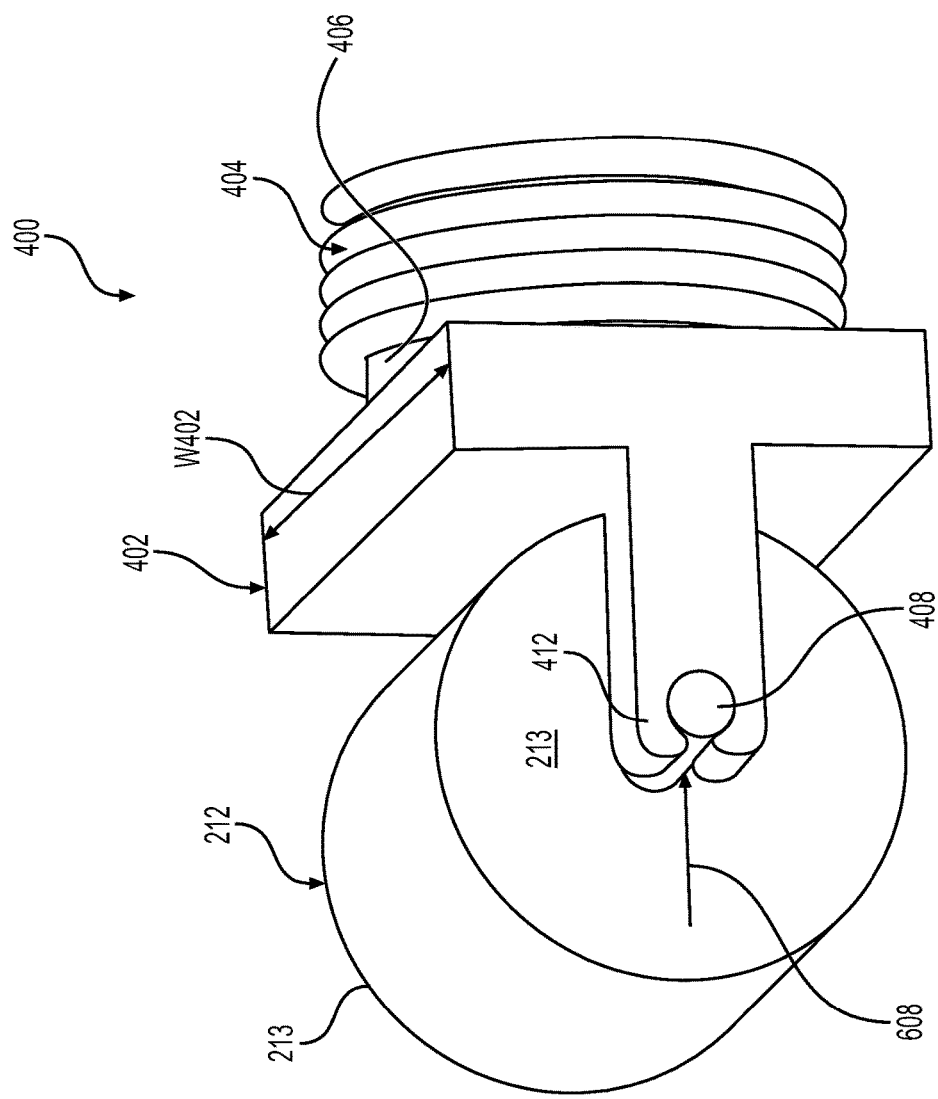
FIG. 5 is a perspective view of a spring loaded roller, yoke, and compression spring removed from the sprocket of FIG. 4. A snap or detent is employed to rotatably attach the roller to the yoke.

Turning now to FIGS. 5 and 7, spring loaded roller subassemblies 400, 500 that may be provided as replacement kits or retrofit kits for sprockets in the field will now be discussed in more detail.

The spring loaded roller subassemblies 400, 500 may include a roller 212, a yoke 402, 502, and a compression spring 404. The yoke 402, 502 may include two arms 410, 510, and the roller 212 may include a cylindrical body including two end faces 213 (e.g., may be planar end faces) that are rotatably attached to the two arms 410, 510. A cylindrical body may provide a line contact (or actually a small rectangular surface of contact due to deformation) with the bushing of the track link assembly, helping to reduce stresses and wear. However, other configuration are deemed to be within the scope of this disclosure including spherical, etc.

The rotatable attachment may be achieved using an axle member 408, 508 that passes through the roller 212 (through a central aperture) and engages the two arms of the yoke 410, 510. In FIG. 5, the two arms 410 of the yoke 408 includes snaps 412 that are configured to receive the axle member 408. In FIG. 7, the two arms 510 of the yoke 502 include an axle receiving aperture 512, and the axle member 508 passes through the axle receiving apertures. Other forms of attachment of the axle member or roller to the arms are contemplated in other designs including detents, roller pins held in place by a cotter pin, etc.

In FIGS. 4, 5, and 7, the compression spring 404 may be attached the yoke 402, 502 in various manners. As shown, the rear of the yoke may include a boss 406 that includes an outer diameter that is slightly larger than the inner diameter of the spring, provide an interference fit. Other forms of attachment are possible including bonding, adhesives, welding, insert molding, heat staking, ultrasonic welding, etc. This attachment may ease assembly of the subassemblies 400, 500 into the segments of the sprocket by reducing the risk of losing the spring during insertion as will be discussed in more detail later herein.

In general, any component discussed herein may be made from any suitable material, including, but not limited to, iron, steel, cast-iron, grey-cast iron, white iron, etc. Also, any component discussed herein may be heat treated, induction hardened, carburized, coated, etc.

The yoke may also be made from a resilient, but tough thermoplastic. This may facilitate the snapping of the axle into place during assembly.

The spring may be commercially bought or may be custom made from spring wire or the like, etc. The desired spring constant may be high enough to help ensure that the roller makes contact with the bushing of the track chain assembly during most operating conditions, but low enough to allow the compression spring to be compressed a suitable amount during assembly as will be discussed in more detail later herein.

In general, portions of the sprocket segments may have any suitable shape, size, and/or surface texture. For example, sprocket segment may be configured as a small arc, a large arc, a complete 360 revolution, etc.

INDUSTRIAL APPLICABILITY

A sprocket segment, a sprocket segment assembly, a spring loaded roller subassembly and/or a component of any these assemblies or subassemblies according to any embodiment discussed herein may be provided as a replacement part in the field or in an OEM (Original Equipment Manufacturer) context.

The roller in particular as well as the sprocket segment may be subject to wear and are thus designed to be replaced. Hence, fastening or the like may be employed.

To that end, a method 600 of assembly will now be described with reference to FIGS. 3 thru 7. First, the compression spring is compressed (see step 602 in FIG. 4) so that the yoke and the compression may be inserted (see step 604 in FIG. 4) into the top cavity. This insertion continues until the yoke and compression spring are aligned with the front or center cavity as shown in FIG. 4. The relaxation of the compression spring during the insertion creates enough friction to hold the yoke and the compression spring in place. As alluded to earlier, the compression spring may be attached to the yoke creating a subassembly that eases this insertion step. This may not be the case for other embodiments of the present disclosure.

In FIG. 3, the roller and axle are then pushing into the center cavity and slit respectively, which guide the movement of the roller and axle as they approach the yoke (step 606). Eventually, the axle snaps into the arms of the yoke as represented by FIG. 5 (step 608).

Alternatively, the roller may be inserted into the center cavity until it contacts or nearly contacts the yoke (see step 606a in FIG. 6). Then, the axle member may be aligned with the apertures of the arms of the yoke and the center aperture of the roller, and passed through them (see step 608a in FIG. 7). It is to be understood that the axle member slide along the axial direction through the extended slit in FIG. 6 during this step.

As mentioned earlier herein, a cap may be inserted into the top cavity (step 610 in FIG. 4). This can be done at any time after the yoke and the compression spring have been inserted into the top cavity but may be done last to allow for fine tuning of the yoke and compression spring during the assembly process.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

What is claimed is:

1. A sprocket for use with a track assembly, the sprocket defining a radial direction, a circumferential direction, and an axial direction, the sprocket comprising:
   at least a first circumferential sprocket segment including
      at least one tooth with a first bushing contact surface, a second bushing contact surface, and a top surface extending circumferentially between the first bushing contact surface and the second bushing contact surface, wherein the first bushing contact surface defines:
         a first cavity extending radially from the top surface, and
         a second cavity extending from the first bushing contact surface to the first cavity, and
      wherein the first cavity is spaced away from an intersection of the first bushing contact surface, and the top surface, forming a front side edge; and
   a roller that is disposed in the second cavity.

2. The sprocket of claim 1, wherein the second cavity is spaced away from the intersection of the first bushing contact surface, and the top surface, forming a top ledge.

3. The sprocket of claim 1,
   wherein the front side edge of the first cavity extends axially and radially past the second cavity, and
   wherein the first cavity defines a rear side edge.

4. The sprocket of claim 3, wherein the second cavity defines a bottom ledge that extends to the rear side edge of the first cavity.

5. The sprocket of claim 1,
   wherein the first bushing contact surface further defines a third cavity that extends axially past the second cavity and extends radially a first distance, and
   wherein the second cavity extends radially a second distance that is greater than the first distance.

6. The sprocket of claim 1, wherein the first bushing contact surface and the second bushing contact surface are planar.

7. A sprocket segment assembly for use with a tracked machine, the sprocket segment assembly defining a radial direction, a circumferential direction, and an axial direction, and the sprocket segment assembly comprising:
   at least a first circumferential sprocket segment including
      at least one tooth with a first bushing contact surface, a second bushing contact surface, and a top surface extending circumferentially between the first bushing contact surface and the second bushing contact surface; and
   a roller that is extending past the first bushing contact surface.

8. The sprocket segment assembly of claim 7, wherein the first bushing contact surface defines a cavity and a slit running axially through the cavity that is axially centered on the first bushing contact surface.

9. The sprocket segment assembly of claim 8, wherein:
   the slit defines a slit axial dimension,
   the cavity defines a cavity axial dimension that is less than the slit axial dimension,
   the cavity defines a cavity radial dimension, and
   the slit defines a slit radial dimension that is less than the cavity radial dimension.

10. The sprocket segment assembly of claim 9, wherein the slit is radially and axially centered with respect to the cavity.

11. The sprocket segment assembly of claim 8, wherein the top surface defines a top cavity that extends radially to the cavity and is in communication with the cavity and the slit.

12. The sprocket segment assembly of claim 11, wherein:
   the slit defines a slit axial dimension, and
   the top cavity defines a top cavity axial width that is equal to or greater than the slit axial dimension.

13. The sprocket segment assembly of claim 11, further comprising:
   a spring loaded roller subassembly that is disposed in the cavity, the slit, and the top cavity.

14. The sprocket segment assembly of claim 7, wherein:
   the first bushing contact surface defines a cavity,
   the cavity defines a center cavity radial dimension,
   the roller defines a diameter that is less than the center cavity radial dimension,
   the top surface defines a top cavity,
   the sprocket segment assembly further comprises a compression spring and a yoke,
   the yoke engages a ledge formed by an intersection of the top cavity with the cavity, and
   the yoke includes a rearward extending boss that is surrounded by the compression spring.

15. The sprocket segment assembly of claim 7, further comprising:
a cap that covers a top cavity defined by the top surface,
wherein the roller is proud relative to the first bushing contact surface.

16. A spring loaded roller subassembly for use with a sprocket, the spring loaded roller subassembly comprising:
a roller configured to be disposed in a cavity of a tooth of the sprocket;
a yoke; and
a compression spring
wherein the yoke includes two arms,
wherein the roller includes a cylindrical body including two end faces that are rotatably attached to the two arms, and
wherein the roller defines a diameter that is less than a center cavity radial dimension defined by the cavity.

17. The spring loaded roller subassembly of claim 16, further comprising:
an axle member that passes through the roller and engages the two arms of the yoke,
wherein the compression spring is attached to the yoke.

18. The spring loaded roller subassembly of claim 17, wherein the two arms of the yoke include snaps that are configured to receive the axle member.

19. The spring loaded roller subassembly of claim 17,
wherein the two arms of the yoke include an axle receiving aperture, and
wherein the axle member passes through the axle receiving aperture of each of the two arms.

* * * * *